US007920958B2

(12) United States Patent
Laubender

(10) Patent No.: US 7,920,958 B2

(45) Date of Patent: Apr. 5, 2011

(54) PROCEDURE FOR STARTING AN INTERNAL COMBUSTION ENGINE

(75) Inventor: Jochen Laubender, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 752 days.

(21) Appl. No.: 11/903,860

(22) Filed: Sep. 24, 2007

(65) Prior Publication Data

US 2008/0077308 A1 Mar. 27, 2008

(30) Foreign Application Priority Data

Sep. 27, 2006 (DE) ........................ 10 2006 045 661

(51) Int. Cl.
*G06F 19/00* (2006.01)

(52) U.S. Cl. .................................... 701/113; 123/179.5

(58) Field of Classification Search .................. 701/113, 701/112, 102, 115; 123/179.3, 179.5, 179.15, 123/179.28; 477/74, 83, 84

See application file for complete search history.

(56) References Cited

U.S. PATENT DOCUMENTS

| | | | | |
|---|---|---|---|---|
| 6,098,584 | A * | 8/2000 | Ahner et al. | 123/179.3 |
| 6,951,525 | B2 * | 10/2005 | Ries-Mueller | 477/74 |
| 7,267,090 | B2 * | 9/2007 | Tamai et al. | 123/179.3 |

FOREIGN PATENT DOCUMENTS

JP 2008-82334 A * 4/2008

* cited by examiner

*Primary Examiner* — Hieu T Vo

(74) *Attorney, Agent, or Firm* — Merchant & Gould P.C.

(57) ABSTRACT

In order to make a start-up of an internal combustion engine as quick as possible, whereby an electrical power output, which is as small as possible, is required, it is proposed to at least periodically activate a direct starting control device for the generation of a combustion torque and an electrical starter for the generation of a starter torque simultaneously during the start-up. In so doing, the power output of the electric starter is controlled as a function of a current combustion torque, so that the starter is continually operated only at a currently required power output. For this purpose, the electric starter is, for example, controlled in an open- and/or closed-loop in such a way that the current total torque resulting from the current combustion torque and the current starter torque does not undershoot a specifiable set point torque.

11 Claims, 3 Drawing Sheets

1 - vehicle
2 - engine
3 - control unit
4 - signal line
5 - starter
6 - signal line
7 - engine control unit
8 - processor
9 - storage element
10 - processor
11 - storage element
12 - cylinder
13 - injection valve
14 - signal line
15 - sensor
16 - data line

PROCEDURE FOR STARTING AN INTERNAL COMBUSTION ENGINE

BRIEF SUMMARY OF THE INVENTION

The invention concerns a procedure for the starting of an internal combustion engine, whereby an activatable direct starting control device and an activatable electric starter are attached to the internal combustion engine.

The invention additionally concerns a control unit for the open-loop and/or closed-loop control of an electric starter for the starting of an internal combustion engine.

The invention furthermore concerns an internal combustion engine, to which an activatable electric starter and a direct starting control device are attached. The invention also concerns a computer program, which is capable of being run on a computer, particularly in a control unit for the open-loop and/or closed-loop control of an electric starter for the starting of an internal combustion engine.

It is known to start an internal combustion engine by means of an electromotor, which is designated as the starting motor. In this connection the internal combustion engine is brought to a starting rotational speed by the starter. The power output to be generated by the starter for a reliable starting of the internal combustion engine depends upon the model of the starter, the output capability of the available voltage source, for example a motor vehicle's battery, as well as particularly the model of the internal combustion engine, which is to be started.

By means of the starter, the internal combustion engine is brought to a rotational speed, from which a reliable operation of the internal combustion engine is possible, i.e. the generation of a required torque by the power output of combustion.

Each starting process, which is implemented by the electric starter, requires a relatively large amount of electrical energy. This is, for example, kept ready by a motor vehicle battery, which must be sized accordingly. Each starting process represents a large load on the power supply source and on the entire vehicle electrical system. Therefore, it is desirable to start the internal combustion engine as quickly as possible. A quick starting also allows for a reduction of the wear on the starter, which is not immaterial; and in so doing an increase in the comfort, in that the time is shortened, during which the starter noise occurs, which is often perceived to be unpleasant.

Especially in the case of motor vehicles, which can be operated in a so-called start-stop operation, it is known to make provision for a direct starting control device. The direct starting control device makes it possible, for example, to turn off the internal combustion engine when the motor vehicle is stopping for a relatively short time, for example at a light which has just changed to red; and the device especially makes it possible to quickly restart the engine if the motor vehicle is to once again be set in motion, for example after the stopping phase resulting from the red light. Provision is consequently made in the direct starting procedure to start the internal combustion engine without an electric starter. This is, however, normally only possible under certain conditions. For example, the internal combustion engine must be at approximately operating temperature. Additionally the internal combustion engine must be located in a certain crankshaft or camshaft position in order for direct starting to occur. In order to achieve this, a controlled shutdown of the internal combustion engine is, for example, implemented.

Additionally, a so-called starter assisted direct starting of the internal combustion engine is known. In this connection, starting of the engine results from the fuel injection and the ignition while the starter is being cranked; hence before each start-up, the cylinder is identified, which is situated in the compression phase. Fuel is brought into and ignited in this cylinder before or during the compression phase, while the internal combustion engine is set into rotational motion on account of the starter torque generated by the actuated starter. The mixture is ignited after the piston sweep of the so-called top dead center of the selected cylinder. Because the starter torque already works very early together with the combustion torque in this starting procedure, the starting process can be shortened. However, in this procedure a relatively high starter power output is necessary. Furthermore, a relatively high amount of starter noise can be perceived during this starting process.

BACKGROUND OF THE INVENTION

It is the task of the invention to create a possibility, which on the one hand allows for a rapid as possible start-up of the internal combustion engine and on the other hand requires the least possible electrical output. It is additionally the task of the invention to further reduce the starting noise.

The task is thereby solved by a procedure of the kind mentioned at the beginning of the application; in that during the start-up, the direct starting control device for the generation of a combustion torque and the electrical starter for the generation of a starter torque are at least periodically activated simultaneously. In this way the power output of the starter is controlled as a function of the current combustion torque.

This then results in the starter being continually operated only at the currently required power output. For this reason the electric starter is controlled in an open- or closed-loop in such a way that the current total torque resulting from the current combustion torque and the current starter torque does not undershoot a specified set point torque. Thus, it is possible to generate by means of the electric starter just as much torque as is necessary for a reliable start-up of the internal combustion engine. This allows for a deployment of the starter, which is especially free from wear. By operating the starter continually only at the power output required at the moment, the noise level of the starting process can furthermore be effectively reduced. In addition the vehicle electrical system is thereby stressed only to the point which is necessary for a reliable start-up of the internal combustion engine.

When the procedure according to the invention is used, the torques do not, however, need to be explicitly acquired. On the contrary, the open- and/or closed loop control of the electrical starter is preferably implemented as a function of an acquired time, a current engine temperature, a current vehicle electrical system voltage, a current crankshaft or camshaft position of the internal combustion engine, a current rotational speed of the internal combustion engine, a current increase in engine rotational speed, a specifiable set point torque, a current total torque and/or a current compression torque. This makes it possible at least indirectly to make an inference about the torques previously mentioned. Parameters of this kind particularly allow for an even improved execution of the procedure according to the invention. It can, for example, be determined by means of a current time if the starter is initially suppose to generate an especially large starter torque in order to achieve as quickly as possible a relatively large combustion torque, from which the starter torque could then be significantly reduced. It can also be determined by means of the same current time if the starter is initially suppose to generate only a very small starter torque in order, for example, to be able to move the internal combustion engine just exactly into a crankshaft or camshaft position, from which the generation of a combustion torque is possible. Provision could also be made at this point to provide for varying set point torques as a function of a current time. A current engine rotational speed can be alternatively or additionally acquired to a current time.

It is particularly advantageous if a current crankshaft or camshaft position of the internal combustion engine, which is indicated, for example, in the form of crankshaft angle, is used for the open-loop control of the starter and in so doing for the starter torque. For example, the starter can in this case then always produce a specified starter torque if the internal combustion engine is located in a crankshaft position, at which one cylinder is the compression phase and had not yet advanced beyond the so-called top dead center.

By means of an engine rotational speed increase, inference can, for example, be made about a current total torque. During a particularly rapid increase in engine rotational speed, the starter torque can then be accordingly reduced or entirely deactivated.

If a current vehicle electrical system voltage is acquired and it turns out that it is relatively low, provision can thus be made to have the starter produce a part of the total torque, which is as small as possible, so that the starting process is in fact possibly lengthened but nevertheless provides for a reliable start-up of the internal combustion engine.

According to an advantageous form of embodiment of the procedure according to the invention, the direct injection device is activated, and the electric starter is subsequently activated as a function of a specifiable event. The event can in this case preferably be described by the elapsing of a specifiable period of time, the achievement or non-achievement of a specifiable engine rotational speed, the achievement or non-achievement of a specifiable increase in engine rotational speed, the achievement of a specifiable crankshaft or camshaft position of the internal combustion engine or the achievement or non-achievement of a specifiable total torque.

This makes it possible to once again reduce the deployment of the starter because a compression torque is initially produced, by means of which the internal combustion engine can be already set into rotational motion. In order, however, to still keep the start-up as short as possible, the electric starter can be activated after a certain number of revolutions of the internal combustion engine or after a specifiable time period has elapsed in order to achieve by means of the starter torque, which is thereby generated, a then specifiable set point torque.

Preferably the electric starter is at least activated in the instance if the compression torque is not sufficient to allow for a reliable piston sweep of top dead center in a subsequent cylinder with regard to a present combustion cycle. In so doing, on the one hand the starter is activated only for a short time and has a power consumption, which is as small as possible, in that it is controlled in an open-loop in such a way that it only supplies a proportion as small as possible to the total torque. On the other hand, a reliable start-up of the internal combustion engine is, however, still continually possible.

According to another advantageous form of embodiment of the procedure according to the invention, the electric starter is initially activated; and the direct starting control device for the implementation of at least one combustion cycle in at least one cylinder is subsequently activated as a function of a specifiable event. In this case, the internal combustion engine can initially be set into rotational motion by means of the electric starter. The direct starting control device can in this case then be activated, if this would allow for an especially efficient combustion. This is often only possible upwards from a certain engine rotational speed.

The direct starting control device is activated in this case for the implementation of at least one combustion cycle in at least one cylinder, so that a reliable piston sweep of top dead center in a subsequent cylinder with regard to the present combustion cycle is made possible. Consequently the starting torque is precisely so selected that a revolution of the internal combustion engine up to a crankshaft or camshaft position is possible, at which a combustion cycle can take place.

The internal combustion engine requires an especially large torque in each compression phase of each cylinder before sweeping top dead center in order to be set in rotational motion. This increased torque is preferably thereby achieved, in that a combustion cycle is introduced by way of the direct starting control device exactly when this increased torque is necessary. When this happens, the starter torque can often be immediately reduced. Because often only a very small combustion torque or no combustion torque at all is present especially when the number of revolutions is very small between two consecutive combustion cycles, the starter can be actuated in these crankshaft or camshaft positions of the internal combustion engine in such a way that a larger starter torque is again generated.

The starter torque is advantageously controlled in an open-loop in such a way during the starting process that an optimal total torque can be achieved. Preferably at least one optimizing criterion is used for the determination of the optimal total torque. The set point torque, for example, can be specified in such a way that a starting time period, which is as short as possible, can be achieved. The starting process can furthermore be optimized to such an extent that a heat loss, which, for example occurs on the cylinder wall during a combustion cycle, is kept as small as possible. The latter is basically possible then if the combustion cycles take place consecutively as rapidly as possible. For this to occur, a greater rotational speed of the internal combustion engine is therefore necessary.

Additional optimizing criteria comprise the possible wear on the starter, the maximum peak power consumption of the electric starter, the total power consumption of the electric starter during the starting process, the start-up noise as well as the starter noise. These criteria can be especially well used in developing an open- and/or closed-loop strategy for the electric starter and in so doing for the starter torque, which is to be generated.

The necessary specifiable parameters for the open- and or closed-loop control of the starter are advantageously stored by means of at least one engine characteristic map, one truth table or one neural network. These parameters comprise, for example, the optimizing criteria, the possible events as well as the specifiable set point torques.

The task is thereby additionally solved by a control unit as well as by an internal combustion engine of the kind mentioned at the beginning of the application, in that the control unit or the internal combustion engine is designed to implement the procedure according to the invention.

The task is also solved above all by a computer program of the kind mentioned at the beginning of the application, in that the computer program is programmed for the implementation of the procedure according to the invention if the computer program is run on a computer. In so doing, the computer program depicts the invention just as well as the procedure, for whose execution the computer program is programmed.

BRIEF DESCRIPTION OF THE DRAWINGS

Additional characteristics, application possibilities and advantages of the invention result from the following description of examples of embodiment of the invention, which are depicted in the diagrams.

The following are shown.

DETAILED DESCRIPTION

Figure 1:
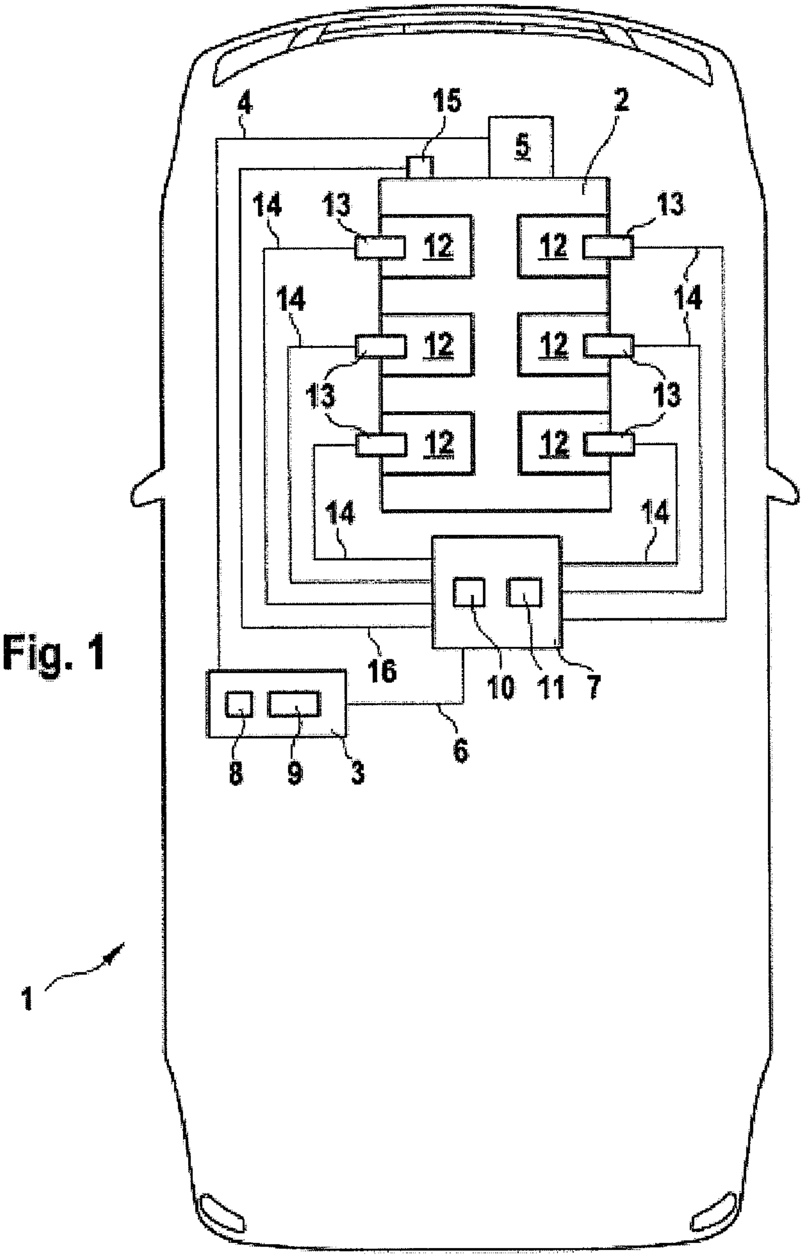
FIG. 1 a schematic depiction of a motor vehicle with an internal combustion engine and a control unit, which are designed to implement the procedure according to the invention.

In FIG. 1 a motor vehicle is boldly schematized, which comprises an internal combustion engine 2 and a control unit 3. The control unit 3 is connected by way of a signal line 4 to an electric starter 5, which is attached to the internal combustion engine 2. An engagement relay and a single track drive assembly can, for example, be assigned to the starter 5. The starter can also be designed as a belt-driven or crankshaft-driven starter generator.

The control unit 3 is connected to an engine control unit 7 by way of a signal line 6. The control unit 3 has a processor 8 and a storage element 9. The engine control unit 7 has a processor 10 and a storage element 11.

The internal combustion engine 2 has cylinders 12, which in each case are assigned a fuel metering device, for example a fuel injection valve 13. The fuel injection valves 13 are connected by way of signal lines 14 to the engine control unit 7.

Additionally an absolute angle sensor 15 is assigned to the internal combustion engine 2. This sensor is connected by way of a data line 16 to the engine control unit 7.

An open- and/or closed loop control of the output of the starter 5 and thus the starter torque is possible by means of the control unit 3. For this purpose the procedure according to the invention is, for example, stored in the form of a computer program on the storage element 9 and executed by the processor 8.

The engine control unit 7 controls in an open- or closed-loop the operation of the internal combustion engine 2. The tasks of the engine control unit 7 comprise, for example, a cylinder charging control, a mixture formation and an ignition control. For this purpose, multiple known sensor values are readout and suitable actuators are activated. A direct starting control device can additionally be implemented by means of the engine control unit 7. For this purpose a suitable computer program is stored on the storage element 11 and is executed by the processor 10. The direct starting control device thus allows for a start-up of the internal combustion engine 2; in that by means of targeted combustion cycles in certain cylinders, the internal combustion engine 2 is set in motion until a rotational speed is achieved, at which a normal operation of the internal combustion engine 2 is possible. A direct start-up is, however, normally only possible under certain preconditions. These preconditions vary as a function of the selected direct starting procedure. It is, for example, possible that a direct start-up can only be implemented when the engine is at operating temperature. Furthermore, a direct start-up can frequently only then be implemented when the internal combustion engine is located in a certain crankshaft or camshaft position. In this case the position of the internal combustion engine 2 is determined with regard to the crankshaft or the camshaft. In determining the position of the internal combustion engine 2, values ascertained by means of the absolute angle sensor 15 can be used.

In the example of embodiment depicted in FIG. 1, the control unit 3 is connected by way of the signal line 6 to the engine control unit 7. In so doing, information is transmitted from the engine control unit 7 to the control unit 3. This information is required for an open- and/or closed-loop control of the starter 5 by the control unit 3. It is, however, also conceivable for the control unit 3 to be directly connected to the elements, for example sensors, which provide the required information. It is particularly conceivable for the control unit 3 to be integrated into the engine control unit 7. This can, for example, result in such a way that the hardware of the control unit 3 is disposed in the engine control unit 7. This, however, can particularly be implemented in such a way that the functionality of the control unit 3 is implemented in the engine control unit 7. This can particularly result in such a way that a program code for the implementation of the procedure according to the invention is executed on the processor 10 of the engine control unit 7. In this case the program code would likewise advantageously be stored in the storage element 11. In examples of embodiment of this kind, the engine control unit 7 would, of course, be connected by way of a signal line, for example the signal line 4, to the starter 5.

Figure 2:
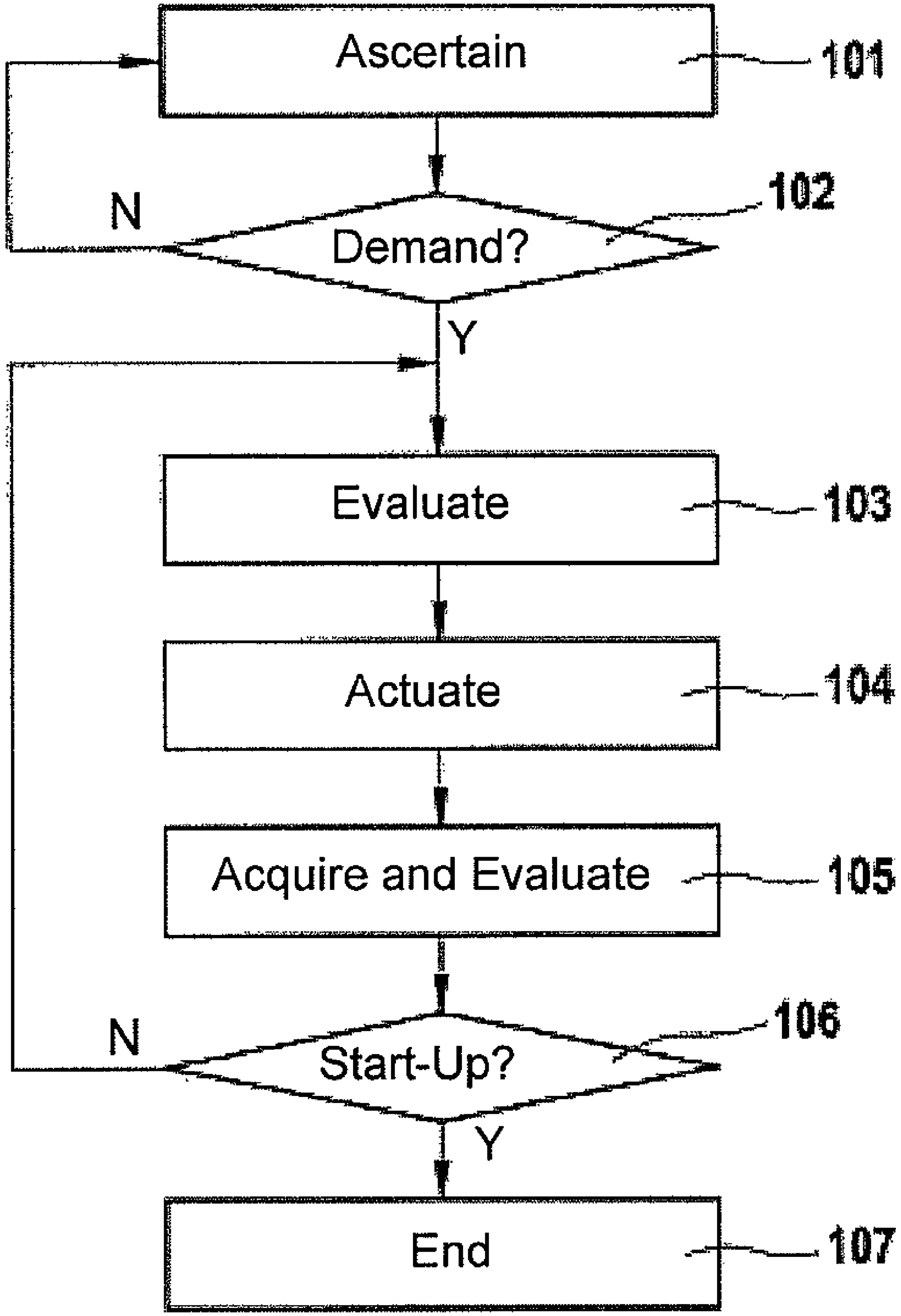
FIG. 2 a schematic flowchart of a first example of embodiment of the procedure according to the invention.
Figure 3:
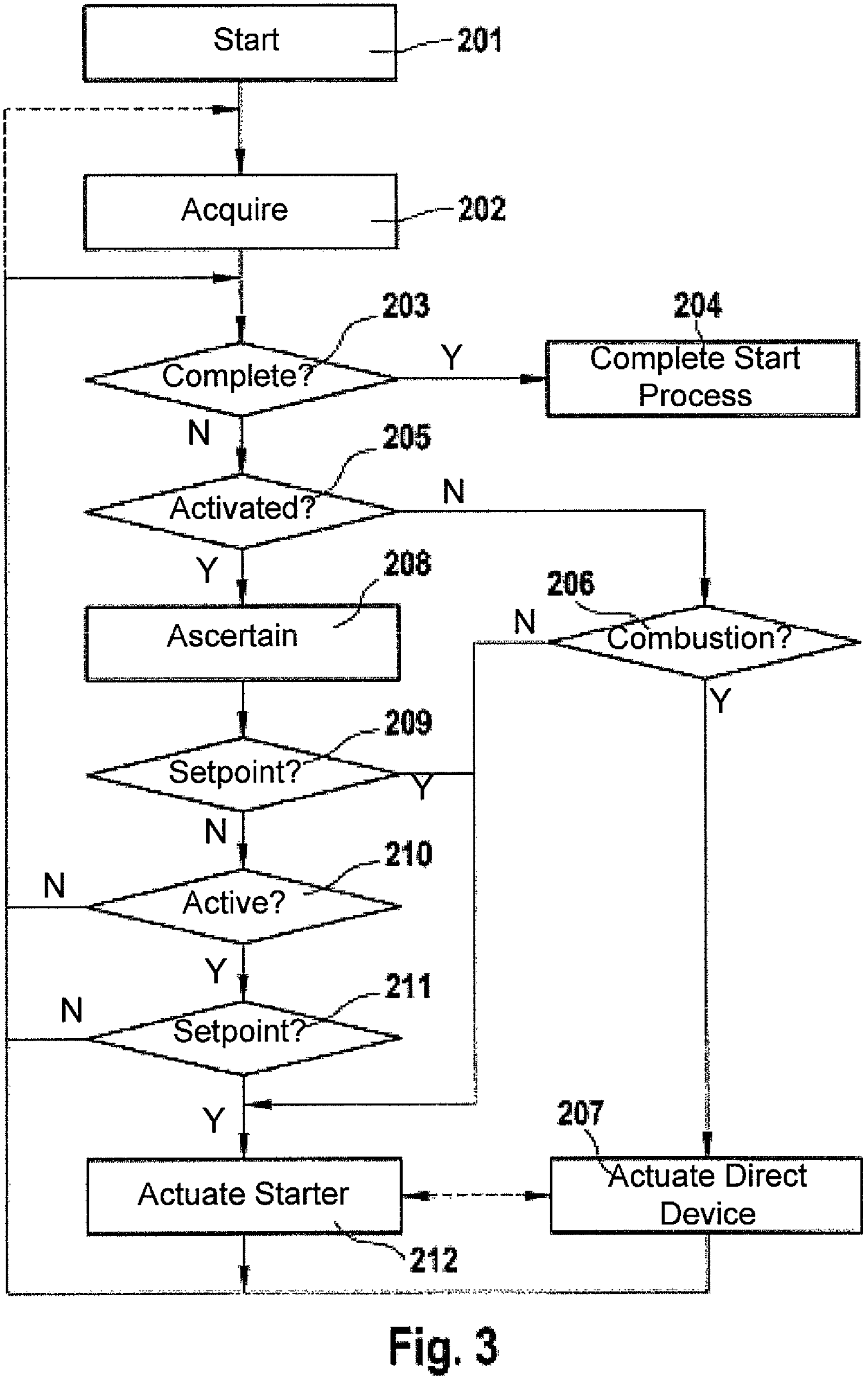
FIG. 3 a schematic flowchart of an additional example of embodiment of the procedure according to the invention.

An interaction of the individual component parts of the motor vehicle 1 depicted in FIG. 1 is described using the examples of embodiment of the procedure according to the invention, which are exemplary depicted in FIGS. 2 and 3.

The flowchart of a very simplified example of embodiment of the procedure according to the invention is depicted in FIG. 2. The procedure begins at step 101, where relevant information for the procedure is ascertained. The information necessary for the implementation of the procedure according to the invention can vary as a function of the form of embodiment, which is currently implemented. The relevant information comprises for example:

Specification of cylinder 12, which in a direct starting procedure is supposed to be actuated initially for the generation of a combustion torque, a piston position of a cylinder 12, an ambient temperature, an oil temperature, a temperature assigned to the internal combustion engine 2, a temperature of a combustion chamber formed in a cylinder 12, a temperature in an intake manifold, a temperature of an emission control system disposed in the motor vehicle, a temperature of an engine coolant, a current pressure in a fuel line, particularly in a high pressure fuel line (so-called rail), an ambient pressure, a current pressure in an intake manifold, a current pressure in one or multiple combustion chambers, a current voltage of a voltage source, particularly a current voltage of the motor vehicle's battery, a fuel quality, which is currently used, a currently engaged gear, current valve control times, a current valve lift, a currently obtainable compression, a current crankshaft or camshaft position of the internal combustion engine 2, a current value of a throttle valve, current information regarding an exhaust gas recirculation device, a current injection delay time (time between the start of actuation and the start of fuel injection).

The information mentioned above is suited individually or in combinations to determine a set point torque for one or multiple points in time, respectively crankshaft or camshaft positions of the internal combustion engine 2. This set point torque can particularly be determined as a function of varying optimizing criteria. If, for example, a current temperature of the internal combustion engine 2 is relatively low, so that a subsequent start-up would be a so-called cold start-up, provision can be made for an especially large set point torque in order to reliably and as rapidly as possible start the internal combustion engine 2.

A current position of the internal combustion engine 2 can provide the necessary information whether initially only the direct starting procedure ought to be activated in order that the engine is assisted by the starter during the start-up, particularly when crossing top dead center; or if initially the starter is actuated in order to bring the internal combustion engine 2 into a position, from which, respectively at which, an activation of the direct starting control device is possible. In this regard an activation of the direct starting control device, of course, indicates that during the start-up of the internal combustion engine 2 at least individual combustion cycles are implemented, for example at certain times or at certain positions of the internal combustion engine 2.

In step 102 a test is made to see if a starting demand exists. A starting demand can, for example, exist due to the fact that the driver activates a starter button or turns an ignition key to a particular position. A starting demand can also then especially arise during a start-stop operation if the internal combustion engine 2 is turned off and a torque demand is present, for example through the operation of a pedal position sensor by the driver.

If no starting condition exists, the process can be returned back to step 101. One or multiple relevant pieces of information can, for example, once again be acquired there after a specifiable period of time has elapsed.

If a starting condition exists, the relevant information is evaluated by the control unit 3 in step 103. Provision can, for example, be made at this juncture for the relevant information to be initially acquired and stored by the engine control unit 7 and then be transmitted by way of the signal line 6 to the control unit 3. It is likewise conceivable that the relevant information is, for example, deposited in the storage element 9 and now readout. Above all it is, of course, conceivable that the relevant information is directly acquired by the control unit 3, or that the control unit 3 is merely implemented as a functionality of the engine control unit 7.

In step 103 a closed-loop control strategy is then developed, which at least comprises a decision about how and if the starter 5 is actuated.

In step 104 the starter 5 and/or the direct starting control device is actuated according to the closed-loop control strategy, which was developed, so that a start-up of the internal combustion engine is possible. Preferably the ensuing starting process corresponds to one or more specifiable optimizing criteria.

In step 105 one or multiple pieces of information are acquired and evaluated. Information of this kind comprises, for example, a current engine rotational speed, a current crankshaft or camshaft position of the internal combustion engine 2, a current total rotational torque, a current increase in the engine rotational speed or a current available voltage of the motor vehicle. Of course other information can be acquired, from which the previously mentioned information can be derived. This information fundamentally corresponds to the events denoted above. It is conceivable that such events are initially acquired by the engine control unit 7 and then—processed if necessary—transmitted on to the control unit 3. Here too varying forms of embodiment are, of course, conceivable, which also depend on the specific implementation of the control unit 3 and the engine control unit 7.

In step 105 a current crankshaft or camshaft position of the internal combustion engine 2 can be, for example, suggested by the acquisition of values of an absolute angle sensor 15. Additionally by the monitoring of a current engine rotational speed, respectively an increase in the engine rotational speed, a current total torque of the internal combustion engine 2 can be suggested. Multiple additional combinations of information of this kind are conceivable. A current open-loop, respectively closed-loop, strategy can be ascertained on the basis of a stored engine characteristic map or a stored characteristic curve as a function of the acquired information, respectively of the currently existing events.

In step 106 a test is made to see if the start-up can be completed. This is then normally the case if the internal combustion engine 2 has been accelerated to a rotational speed, from which a normal open- and/or closed-loop control is, for example, possible by the engine control unit 7. If this is not the case, the process returns to step 103, at which the current values are evaluated, and the starter 5, respectively the direct starting control device, is then accordingly actuated as a function of the evaluation.

If in step 106 a completion of the starting process is recognized, the procedure then concludes in step 107, in that the internal combustion engine 2 is now actuated in compliance with an operating mode by the engine control unit 7.

In FIG. 3 a detailed flowchart in compliance with an additional possible form of embodiment of the procedure according to the invention is depicted. The procedure begins at step 201 as soon as a starting demand is present.

In step 202, relevant information is acquired. This information corresponds, for example, to the information, which is ascertained in step 101 of the example of embodiment depicted in FIG. 2. In the example of embodiment depicted in FIG. 3, this information is either directly ascertained or readout from a storage element 9, 11 in step 202. The latter is the case if this information was already previously ascertained and is sufficiently up-to-date. It is also consequently conceivable in the example of embodiment depicted in FIG. 3 that the information has already been ascertained before an existing starting demand, i.e. before step 201.

A test is made in step 203 to see whether the starting process should be completed, for example because a specifiable engine rotational speed has been achieved, from which a reliable operation of the internal combustion engine 2 is possible.

If this is the case, the starting process is completed at a step 204. However, if this is not the case, a test is then made in step 205 to see whether the direct starting control device has been activated. A test is therefore made in step 205 to see whether one or multiple combustion cycles were already implemented in one or multiple cylinders 12.

If the direct starting control device has not been activated, a test is consequently made in step 206 to see whether a combustion cycle in one or more of the cylinders 12 is possible, respectively expedient. If this is the case, for example because the internal combustion engine 2 is located in a crankshaft or camshaft position, from which a combustion torque can be generated by means of the direct starting control device, the direct starting control device is thus accordingly actuated in step 207. The actuation of the direct starting control device comprises particularly the metering of fuel and the ignition of the metered fuel in the corresponding cylinders 12. At this juncture a direct or indirect acquisition of the current crankshaft or camshaft position of the internal combustion engine 2 is, of course, necessary. An indirect acquisition of the position can be, for example, implemented by way of the acquisition of a combustion chamber pressure and/or a currently elapsed time. Additional variables to be taken into account for the actuation of the direct starting control device correspond basically to the variables necessary for the operation of the internal combustion engine 2.

A return is then made from step 207 to step 203, where a test is made to see if the starting process should be completed. Of course, it is just as conceivable that a return is made to step 202, where current relevant data are acquired. This is depicted by the dashed line.

If the test in step 206 produced the result that an activation of the direct starting control device is presently neither possible nor expedient, i.e. a combustion torque still cannot or ought not be generated, the process thus branches out from step 206 to step 212. In step 212, the starter 5 is actuated in such a way that a start-up of the internal combustion engine is possible. This means that the internal combustion engine 2 has to be set into rotational motion. Hence, the starter torque necessary to do this has to basically make a revolution of the internal combustion engine 2 possible. Additional requirements for the starter torque, which is to be generated, and consequently for the open-loop control, respectively closed-loop control, of the power output result as a function of varying optimizing criteria. At this juncture, it can be taken into account whether an especially quick or an especially quiet start shall occur. Furthermore, information especially with regard to a current vehicle voltage, a current temperature of the internal combustion engine or a current crankshaft or camshaft position of the internal combustion engine 2 can be taken into account.

A return is then likewise made from step 212 to step 203, respectively 202.

If the test in step 205 showed that a direct start-up has already been activated, and thus that this is possible, respectively expedient, a current set point torque is then ascertained in step 208. A current total torque is additionally ascertained in step 208. The total torque is thereby constituted from the combustion torque and a possibly present starter torque. The engine characteristic map can at this point determine the currently required set point torque as a function of a current crankshaft or camshaft position of the internal combustion engine 2, respectively as a function of a current engine rotational speed. The current set point torque can especially take different optimizing strategies into account. If, for example, the set point torque is continually relatively large, a relatively rapid starting process is thus basically achieved. The set point torque can be further ascertained on the basis of a neural network, whereby the information ascertained during the implementation of the procedure can be used as input variables.

In step 109 a test is made to see whether the current total torque lies beneath the current set point torque. If this is the case, the process branches out to step 212, in which the starter 5 is actuated in such a way that a starter torque is produced, which makes achievement of the set point torque possible.

If the total torque ascertained does not lie below the set point torque, a test is made in step 210 to see whether the starter is active. If this is not the case, the process reverts back to step 202 or step 203.

If the test in step 210 shows that the starter 5 is active, a test is then made in step 211 to see whether the current total torque exceeds the current set point torque. If this is the case, the process branches out to step 212; and the starter 5 is actuated in an open-loop, respectively closed-loop, in order to reduce the starter torque in such a way that the total torque corresponds to the set point torque. The power output supplied to the starter 5 is consequently reduced as soon as the current total torque exceeds a necessary, respectively predetermined, set point torque. This allows for an operation of the starter 5 exactly in that instance when the compression torque is not sufficient to make a start-up of the internal combustion engine 2 possible by means of the direct starting control device. In addition this also particularly allows for the power consumption of the starter 5 to be just so high that a starting process is implemented, which is optimized according to the specifiable optimizing criteria.

A return is likewise again made from step 212 to step 202, respectively step 203.

The form of embodiment depicted in FIG. 3 is used as an example and is only one of many possible implementations of the procedure according to the invention. Additional forms of embodiment can vary especially in the order of the steps to be executed. The relevant information can, for example, be permanently parallel ascertained. Furthermore, it is possible to ascertain the relevant information at many additional points. The relevant information particularly need not be necessarily acquired in a coherent step. This can in fact be ascertained in such a way that it is available in its most up-dated form exactly when it is needed.

Additional possible forms of embodiment of the procedure according to the invention also particularly comprise details, which are not shown in the figures depicted for reasons of clarity. If, for example, it is recognized in step 211 that a current total torque lies above a current set point torque, the direct starting control device can also be actuated in such a way that a reduction of the combustion torque results. This can then, for example, be advantageous if an optimizing strategy makes provision for fuel consumption during the starting process to be as small as possible.

An additional, different example of embodiment already arises then if in step 205 a test initially is made to see if the starter 5 is currently activated. In this instance the logically consecutive procedural steps have to, of course, be accordingly developed to fit their need.

According to a further from of embodiment, the actuation of the starter 5, respectively the direct starting control device, is achieved by means of a neural network. In a neural network of this kind, the optimizing criteria can be implicitly stored. In such a form of embodiment, current information is, for example, acquired and supplied to the neural network. The output variables comprise then, for example, information, which serves as a basis for an actuation of the direct starting control device and the starter 5. Of course in this form of embodiment, the current torques—total torque, starter torque, combustion torque, set point torque—, respectively the variables describing these torques, would not need to be explicitly acquired. These would in fact be at least partially implicitly existent and would be in certain circumstances merely theoretically describable for the purpose of describing a model corresponding to the neural network.

A form of embodiment implemented by means of a neural network has especially the advantage that it could be designed as a self-learning system. If values are, for example, acquired, which can describe the quality of the currently implemented starting process, these could then be used by means of a procedure known as feed-back propagation in order to change the neural network to such an extent that previously specified optimizing criteria can be particularly reliably achieved.

It is particularly advantageous if between the open-loop control, respectively closed-loop control, of the starter 5 and the open-loop control, respectively closed-loop control, of individual combustion cycles during the start-up of the internal combustion engine 2, i.e. an open-loop control, respectively closed-loop control, of the direct starting control device, a balancing continually takes place in such a manner that an optimal starting performance is continually achieved. Consequently an open-loop control of the power output of the starter 5 does not only occur in order to adjust the current total torque to the current set point torque; but in fact an open-loop control of the direct starting device takes place simultaneously in order to achieve a starting performance, which is as optimal as possible.

The forms of embodiment depicted in FIGS. 2 and 3 thus merely describe possibilities in order to point out possible dependencies of components, which allow for an implementation of the procedure according to the invention. Of course, many other components can be added. Additionally some individual components can be dispensed with as long as it is assured that the power output of the starter 5 is controlled, for example based on the angle of crankshaft rotation or time based, in such a way that a reliable start-up of the internal combustion engine 2 is possible. This particularly means that the starter 5 is actuated in such a way that when the piston sweeps top dead center of the cylinders 12, a predetermined rotational speed of the internal combustion engine 2 is continually assured.

By means of the procedure according to the invention, it is therefore possible to actuate the starter 5 as a function of varying, specifiable optimizing criteria precisely in such a manner to allow for a reliable start-up of the internal combustion engine 2 and still achieve a stress on the vehicle electrical system and a level of starting noise, which are as minimal as possible. A very short start-up time can be achieved through the interaction of the optimized starter torque with the combustion torque as well as with the starter actuation, which is power output controlled. For this reason the system according to the invention, respectively the procedure according to the invention, can be advantageously deployed for a start-stop operation of the internal combustion engine 2 as well as for an especially rapid conventional start-up of an internal combustion engine 2.

The invention claimed is:

1. An internal combustion engine comprising an electric starter and a direct starting control device, wherein the internal combustion engine is configured such that during a starting process the direct starting control device and the electric starter are at least periodically simultaneously activated; and an open-loop or closed-loop control of electric starter power output is implemented such that a variable corresponding to a current total torque is maintained greater than a variable corresponding to a specifiable set point torque, wherein the variable corresponding to a current total torque corresponds to a sum of a current combustion torque and a current starter torque.

2. A control unit for open-loop and/or closed-loop control of an electric starter of an internal combustion engine, wherein the control unit is configured to periodically simultaneously activate, during a starting process, a direct starting control device for the generation of a combustion torque and the electric starter for the generation of a starter torque, wherein during the starting process an open-loop or closed-loop control of power output of the electric starter is implemented such that a variable corresponding to a current total torque is maintained greater than a variable corresponding to a specifiable set point torque, and wherein the variable corresponding to the current total torque corresponds to the sum of a current combustion torque and a current starter torque.

3. A method of starting an internal combustion engine, wherein an activatable direct starting control device for generating a combustion torque and an activatable electric starter for generating a starter torque are attached to the internal combustion engine, the method comprising:

at least simultaneously activating the direct starting control device and the electric starter during a starting process; and during the starting process, implementing an open loop- or a closed-loop control of power output of the electric starter such that a variable corresponding to a current total torque is maintained greater than a variable corresponding to a specifiable set point torque, wherein the variable corresponding to a current total torque corresponds to a sum of a current combustion torque and a current starter torque.

4. A method according to claim 3, further comprising implementing the open loop- or a closed-loop control as a function of at least one of the following: an acquired time; a current engine temperature; a current vehicle voltage; a current crankshaft or camshaft position of the internal combustion engine; a current rotational speed of the internal combustion engine; an increase in engine rotational speed, which was ascertained; a set point torque; a current total torque; and a current combustion torque.

5. A method according to claim 3, further comprising activating the direct starting control device and subsequently activating the electric starter as a function of a specifiable event.

6. A method according to claim 5, further comprising at least activating the electric starter when engine combustion torque is insufficient to allow for a reliable piston sweep of top dead center in a subsequent cylinder with regard to a present combustion cycle.

7. A method according to claim 3, further comprising activating the electric starter and subsequently activating the direct starting control device as a function of a specifiable event for the implementation of at least one combustion cycle in at least one cylinder.

8. A method according to claim 7, further comprising activating the direct starting control device for the implementation of at least one combustion cycle in at least one cylinder to permit a reliable piston sweep of top dead center in a subsequent cylinder with regard to the present combustion cycle.

9. A method according to claim 8, wherein the specified event is described by at least one of the following conditions: elapsing of a specifiable time period; achievement or non-achievement of a specifiable engine rotational speed; achievement or non-achievement of a specifiable increase in the engine rotational speed; achievement of a specifiable crankshaft or camshaft position of the internal combustion engine; and achievement or non-achievement of a specifiable total torque.

10. A method according to claim 1, further comprising at least partially controlling a starter torque in an open-loop to continually achieve an optimized starting performance, wherein the starting process is optimized according to at least one of: starting time duration; heat loss; wear on the electric starter; maximum peak power consumption of the electric starter; total power consumption of the electric starter during the starting process; starter noise during the starting process; and level of the start-up noise.

11. A method according to claim 3, further comprising storing specifiable parameters for open-loop or closed-loop controlling of the electric starter in one of: an engine characteristic map; a truth table; and a neural network.

* * * * *